United States Patent [19]

Bisiach

[11] Patent Number: 4,702,661
[45] Date of Patent: * Oct. 27, 1987

[54] ROBOT CARRIER STRUCTURE

[76] Inventor: Luciano Bisiach, Strada Communale San Vito-Revigliasco 350, 10133 Turin, Italy

[*] Notice: The portion of the term of this patent subsequent to Jun. 2, 2004 has been disclaimed.

[21] Appl. No.: 742,203

[22] Filed: Jun. 7, 1985

[30] Foreign Application Priority Data

Jun. 19, 1984 [IT] Italy ................ 67631 A/84

[51] Int. Cl.⁴ .................................... B25J 5/00
[52] U.S. Cl. ........................... 414/460; 92/88; 104/146; 104/245; 105/109; 105/112; 105/117; 212/220; 238/232; 295/30; 295/34; 295/31 R; 384/907; 414/626; 414/751; 901/1
[58] Field of Search ............. 414/458, 459, 460, 461, 414/626, 749, 750, 751, 752, 753; 308/DIG. 9; 105/108, 109, 112, 117; 212/96, 220, 221; 295/30, 31 R, 34; 901/1; 104/245, 146; 238/232; 92/88

[56] References Cited

U.S. PATENT DOCUMENTS

| | | | |
|---|---|---|---|
| 1,206,710 | 11/1916 | Jackson | 238/232 |
| 1,522,332 | 1/1925 | Schmitz | 295/31 R |
| 1,596,166 | 8/1926 | Everett | 295/31 R X |
| 2,033,863 | 3/1936 | Piron | 295/31 R |
| 2,622,993 | 12/1952 | McCullough et al. | 308/DIG. 9 X |
| 2,941,675 | 6/1960 | Noble et al. | 414/460 X |
| 3,180,280 | 4/1965 | Kuch et al. | 104/245 |
| 3,266,641 | 8/1966 | Thumin | 414/19 |
| 3,408,954 | 11/1958 | Kademann et al. | 105/117 X |
| 4,283,165 | 8/1981 | Vertut | 901/1 X |
| 4,425,751 | 1/1984 | Bousseau et al. | 901/1 X |

FOREIGN PATENT DOCUMENTS

| | | | |
|---|---|---|---|
| 914136 | 5/1954 | Fed. Rep. of Germany | 105/109 |
| 4438 | 6/1895 | Norway | 295/34 |

Primary Examiner—Frank E. Werner
Attorney, Agent, or Firm—Dilworth, Paxson, Kalish & Kauffman

[57] ABSTRACT

A robot carrier structure constituted by a portal wagon movable on rails and laterially supported by a pair of carriages each comprising a pair of wheels longitudinally coupled by motion transmission means actuated in synchronism by an electric motor. Further the two electric motors of the pair of carriages are so connected as to constitute an electric axis. Each wheel has a structure adapted to ensure a high adherence to the rail, particularly due to the provision of a pair of rings of elastomeric material engaging the rolling surface of the rail.

5 Claims, 6 Drawing Figures

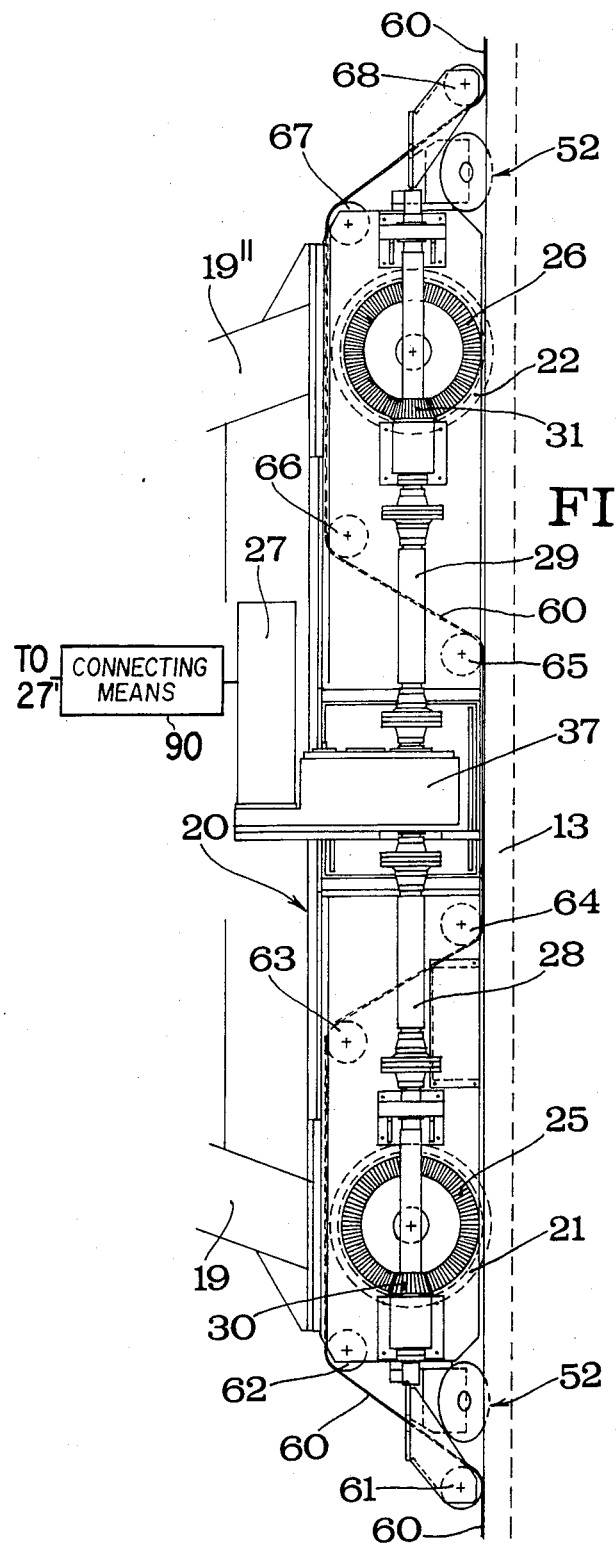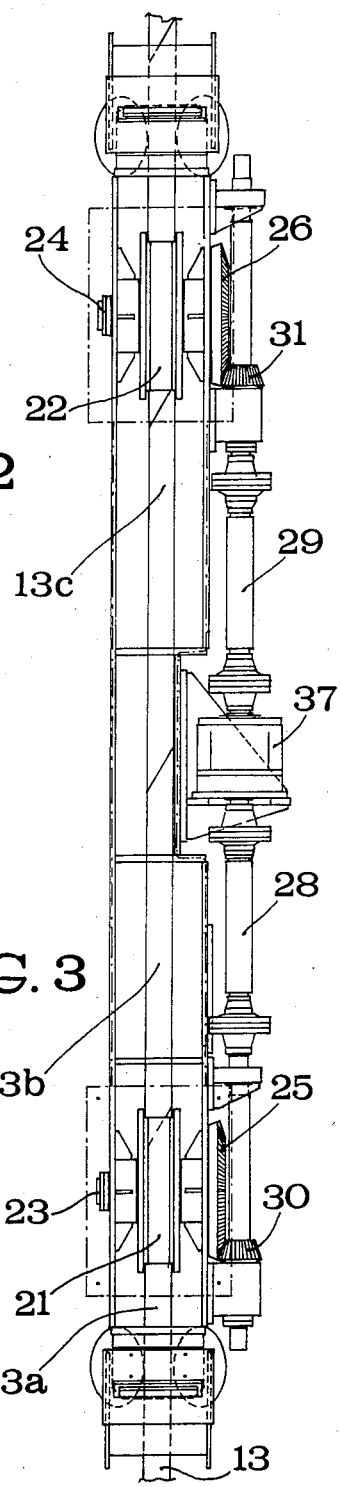

ROBOT CARRIER STRUCTURE

BACKGROUND OF THE INVENTION

This invention relates to a robot carrier structure with a portal wagon movable on rails.

In industrial processing using robots, particularly in automatic welding, the robot is generally designed as a substantially fixed operating unit to which the workpiece is fed from a conveying line along which further processing machines or units are arranged.

Although in high and very high output lines the use of several fixed robots, each of which carries out a part of the overall work on workpieces moving past the robot, is generally efficient and advantageous, in low and very low output lines or lines with diversified production this system has proved to be completely disadvantageous. In fact, it requires the use of an excessive number of robots—as many as there are specific operations to be carried out—and moreover such robots are insufficiently utilized as each of them is operative only for a small fraction of the overall working time.

Therefore, it has been found more advantageous to use only one or a few multi-purpose robots, i.e. robots capable of successively carrying out several operations, however, these robots must be shifted in the operating area close to the workpiece or to the part on which the operation is to be carried out.

It is therefore an object of the present invention to provide a structure for supporting and moving a multipurpose industrial robot, which structure is capable of moving the robot within a predetermined area to convey it to the workpiece to be treated, this structure being further such as to leave the used area, after passage of the structure, free and practicable for potential further use.

In other words, the invention permits to reverse the general concept of a robot as a fixed installation and to provide a transport structure adapted to receive a multipurpose robot so that the robot can carry out several different operations along an entire processing area with low or diversified output.

SUMMARY OF THE INVENTION

These and other objects and advantages of the invention, which will become apparent from the following description, are achieved by a robot carrier structure provided with linear movement and constituted by a portal wagon on which at least one industrial robot with several axes of movement is mounted, this structure being equipped with members for actuation and control of programmed translation of the structure and characterized in that each of the two sides of the portal wagon is supported by a carriage with wheels coupled longitudinally by motion transmission means actuated in synchronism by an electric motor mounted on the carriage, the wheels running on a rail accommodated in an underground runway with a rolling surface located substantially level with the ground and the two electric motors of the two carriages being connected so as to constitute an electric axis to ensure a perfect synchronism of rotation between all the wheels of both carriages.

According to a further aspect of the invention, the structure of the wheel supporting each of the above carriages, comprises a pair of rims defining a groove with the wheel body for engagement with the rail, the inner portions of the rims intended to engage the rail being coated with a self-lubricating metallic material and between the rims and the wheel body there is coaxially accommodated a pair of rings of elastomeric material projecting slightly from the wheel body so as to increase the adherence of the wheel to the rail and avoid slipping.

BRIEF DESCRIPTION OF THE DRAWINGS

FIG. 2 is a part side elevational view of a robot supporting structure according to the invention;

FIG. 3 is a plan view of part of the structure of FIG. 2;

DESCRIPTION OF THE PREFERRED EMBODIMENT

Figure 1:
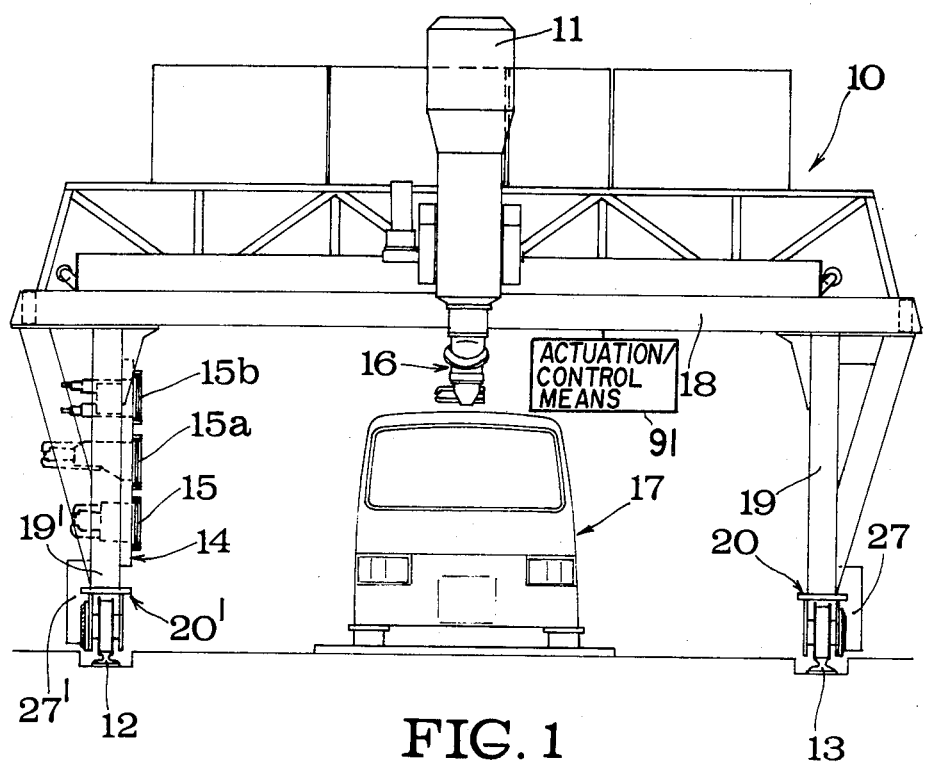
FIG. 1 is a schematic front view of a robot supporting structure according to the invention.

Referring to FIG. 1, indicated by 10 is a portal wagon on which an industrial robot 11 is movably mounted, all shown schematically in front elevation. The portal wagon is movable on a pair of rails 12, 13 running through the working area.

According to a preferred, but not exclusive, embodiment of the invention, the robot 11 is a welding robot with a mechanism for automatically changing the welding guns as described in an Italian Patent Application of the same Applicant.

For this purpose wagon 10 is equipped with a guns magazine 14 in which various guns 15, 15a, 15b are arranged which the robot is capable of picking up and automatically fixing on a head 16 after having deposited on the magazine the previously mounted guns. The wagon 10 is also equipped with means 91 for programmed actuation of the robot and for translation of the wagon.

If the robot is designed to carry out automatic welding operations in a low output line such as the welding of bodies 17 of industrial vehicles, advantageously also further robots, not shown, may be mounted on the wagon 10 in an arrangement adapted to work, for example, on the sides of the body 17.

The processing method with movable robots on the structure described above constitutes an inversion of the conventional practice of use of robots in the industrial field as pointed out in the introductory part to the specification. Particularly if one has a multi-purpose robot as the one mentioned with automatic changing of the welding tool, the number of machines requiring for the execution of many different types of welding can be enormously reduced and the robot can be moved cyclically along the production line from which the workpieces to be welded are successively removed and replaced thereon with considerable advantage both with regard to the installation and running of the line.

However, the achievement of this result depends on the provision of a robot supporting and conveying structure which is at the same time rapid, accurate and reliable.

Referring to FIG. 1, a portal wagon structure according to the invention comprises a platform 18 on which a robot 11 is movably mounted and which is laterally supported by standards as 19, 19' supported by carriages 20, 20'.

Referring to FIG. 2, all the standards of each side of the structure, as 19, 19'', are supported by a single carriage 20 to which explicit reference will be made in the following description, it being understood that the carriage 20' is completely analogous to the carriage 20. Considering also FIG. 3, the carriage 20 comprises a pair of wheels 21 and 22 of the railway type, as will be described hereinafter, these wheels running on the rail 13. Each wheel is firmly secured to a shaft 23, 24 to which, towards the outside of the carriage, is also secured a conical toothed wheel 25, 26. A direct current electric motor 27 fixed centrally on the carriage and connected to a gearmotor 37 actuates in perfect synchronism a pair of shafts 28, 29 to which a pair of pinions 30, 31 is coupled which mesh with the toothed wheels 25 and 26, respectively. This system of transmission of motion between the motor 27 and the wheels 21, 22 ensures a perfect synchronism of rotation therebetween.

Further, the motors 27 and 27' of the carriages 20, 20' of each side of the structure are electrically connected by connecting means 90 to form an electrical axis as is known in the art so that the perfect synchronism of rotation will extend to all four wheels together.

The structure of each wheel constitutes a further important aspect of the invention.

Figure 4:
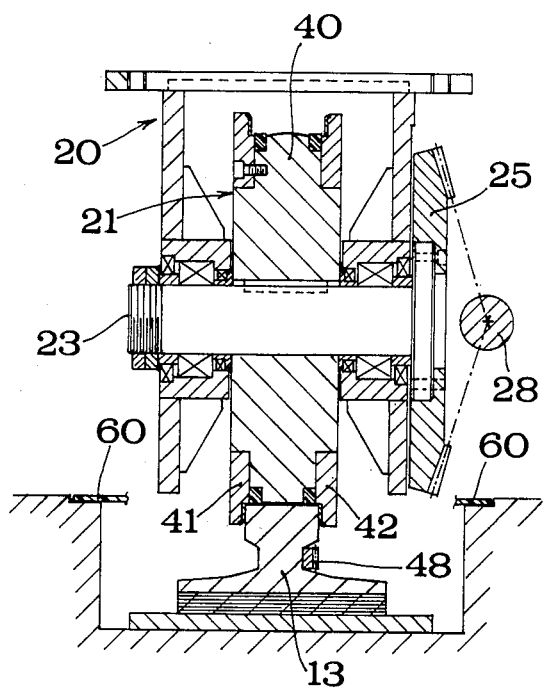
FIG. 4 is an enlarged sectional view of a detail of the structure according to the invention.
Figure 5:
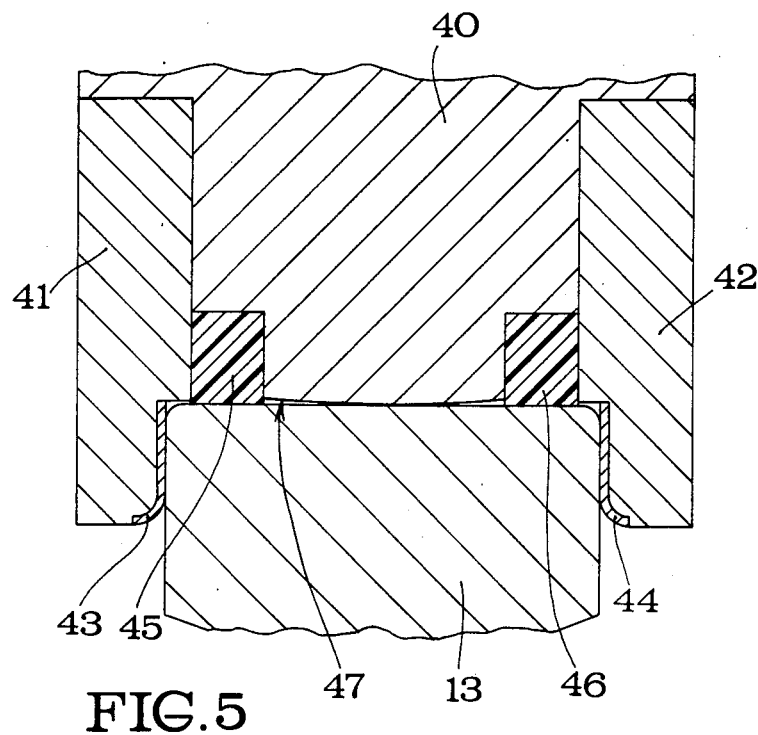
FIG. 5 is an enlarged view of a detail of FIG. 4.

Referring to FIGS. 4 and 5, which by way of example illustrate the wheels 21, each wheel comprising a wheel body 40 of treated steel of good hardness and a pair of rims of flanges 41, 42 projecting peripherally from the profile of wheel body 40 to form a groove adapted for lateral fitted rolling on the rail.

The inner portions of the rims 41 and 42 designed to engage the flanks of the rail are coated with rings 43, 44 of a self-lubricating metallic material, for example molybdenum (FIG. 5).

A pair of rings 45, 46 of elastomeric material is arranged radially inwardly between the rims 41, 42 and appropriate seats in the wheel body 40 so as to be in contact with a rolling surface 47 of the wheel and ensure perfect rolling of the wheel without slipping. Rings 45, 46 project a little from the profile of the wheel body which is slightly convex so as to ensure during operation a perfect adhesion between the rail and the wheel without any risk of axial oscillations. A preferred elastomeric material is the one available in commerce under the Trademark VULKOLLAN which designates a urethane elastomer of BAYER AG.

The wheel structure described above has proved to be very important and advantageous, particularly for eliminating potential slipping which could jeopardize the high accuracy of positioning required for the intended use. Consequently, a reading of the translation of the carriage can be obtained either directly from the number of revolutions of the wheel or from a known encoder system by engagement with a toothing 48 extending longitudinally of the rail 13 (FIG. 4).

Figure 6:
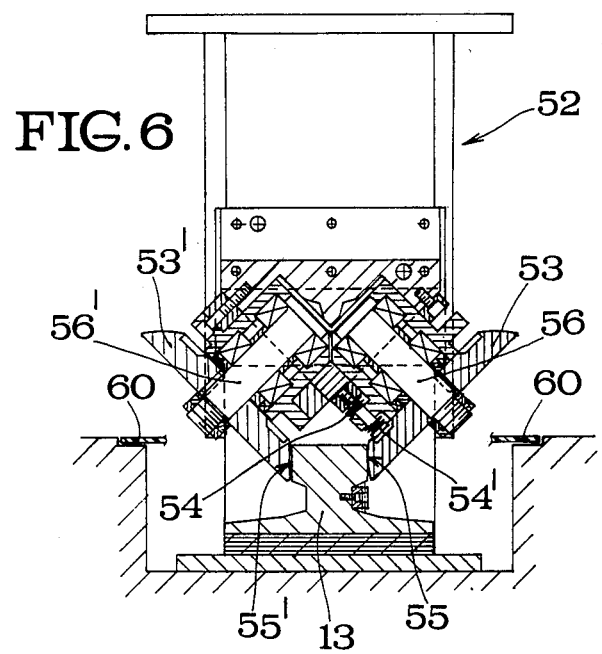
FIG. 6 is a sectional view of another detail of the structure according to the invention.

FIG. 6 illustrates a member which constitutes a complement to the conveying structure according to the invention. It can be adopted to improve the performance of the assembly although it is not always strictly necessary.

Generally designated by 52 in FIG. 2 is a guide assembly firmly mounted in front of and behind the carriage either on one or both sides of the structure, as required. Guide assembly 52 substantially consists of a pair of wheels 53, 53' mounted on idler shafts 56, 56' arranged at 45° relative to the vertical plane so that the wheels converge on the flanks of the rail 13. Whereas the wheel 53' is mounted without any possibility of axial movement, the wheel 53 can perform a certain axial excursion against the reaction of two packs of Belleville washers 54, 54', which permits to always maintain a forced engagement between the oblique surfaces 55, 55' of the wheel and the flanks of the rail.

This guide assembly stabilizes the carriage against potential oscillations acting in a sideways direction, thus increasing the accuracy of the overall attitude during the translating motion.

As is evident particularly from FIGS. 4 and 6, the rails 12 and 13 are accommodated in underground runways of a depth such that the rolling surface of the rail will be located substantially level with the ground.

According to a further feature of the invention, a sturdy flexible belt 60 extends throughout the robot carrier structure and has a width equal to that of the runway which is upwardly closed by the belt, as shown also in FIG. 2, over its entire extension except for the length covered by the robot carrier structure.

Over this length the belt 60 is deflected between rollers 61, 62, 63, 64, 65, 66, 67 and 68 so as to be lifted above the wheels. This feature permits to obtain a permanent covering of the runway and, after passage of the carriage, permits the working area to be left free and practicable by operators, as stated in the introductory part to the specification.

Finally, it can be seen from FIG. 3 that each rail is formed of continuous portions 13a, 13b, 13c connected by acute angle sections to eliminate possible discontinuities on the rolling plane.

Although in the foregoing description of the preferred embodiment of the invention reference has been made to a robot carrier structure on which a welding robot is mounted, it is evident that this structure can be adavantageously used for conveying other types of industrial robots in view of the characteristics of high accuracy of this structure. Further, the structure permits of numerous modifications and variations within the scope of the same inventive idea.

I claim:

1. A robot carrier structure for linear movement along a predetermined working area, supporting at least one industrial robot with several axes of movement said structure comprising:
   a. a portal wagon consisting of a robot carrier platform and lateral standards;
   b. a plurality of carriages supporting said lateral standards of said portal wagon, each of said carriages being mounted on two wheels adapted to run on rails accommodated in underground runways with rolling surfaces located substantially level with the ground and a movable closure surface being provided for said underground runways;
   c. motor means mounted in each of said carriages, connected to each other so as to constitute a perfectly synchronized means of operation of said wheels of said carriages;
   d. motion transmission means for said two wheels of each carriage, driven by said motor means comprising a pair of shafts carrying at their opposed ends a pair of control pinions each meshing with a toothed wheel secured to each of said two wheels of said carriages, whereby the rotation of said wheels is perfectly synchronized and the linear movement of said structure is perfectly controlled to obtain a high degree of accuracy in positioning said carrier structure;

wherein each of said wheels of said carriages comprises a pair of rims defining a groove with a central wheel body with a convex profile, the inner portions of said rims intended to engage the flanks of said rail and being coated with self lubricating metallic material, and pair of rings of elastomeric material located between said rims and said wheel body to project from the profile of said wheel body to increase the adherence of said wheel to said rail.

2. A robot carrier structure as claimed in claim 1, wherein said self-lubricating material is molybdenum.

3. A robot carrier structure as in claim 1, further comprising a series of deflection rollers mounted on each of said carriages, having horizontal axes and located partly level with the ground and partly above said wheels of said carriages, a flexible belt being guided around said rollers to form said movable closure surface for said underground runways.

4. A robot carrier structure as in claim 1, wherein said portal wagon is provided with means for actuation and control of programmed translation thereof.

5. A robot carrier structure as claimed in claim 4, wherein groups of guides are connected forwardly and rearwardly to at least one side of said structure, each of said groups comprising a pair of wheels mounted on idler shafts arranged at 45° relative to the vertical plane so that said wheels embrace the flanks of said rail, one of said wheels being free to make a limited axial excursion against spring pressure.

* * * * *